Patented Jan. 2, 1951

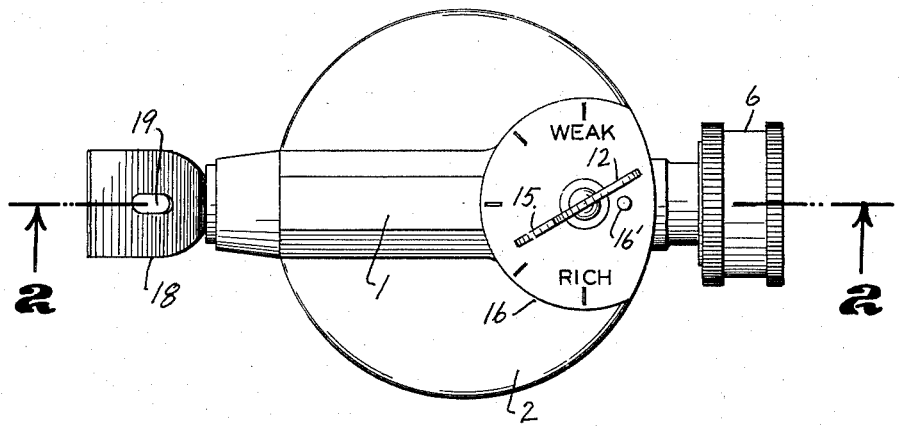
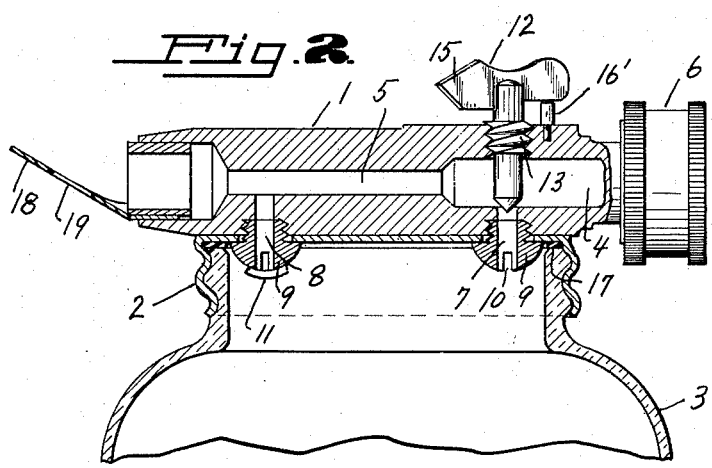
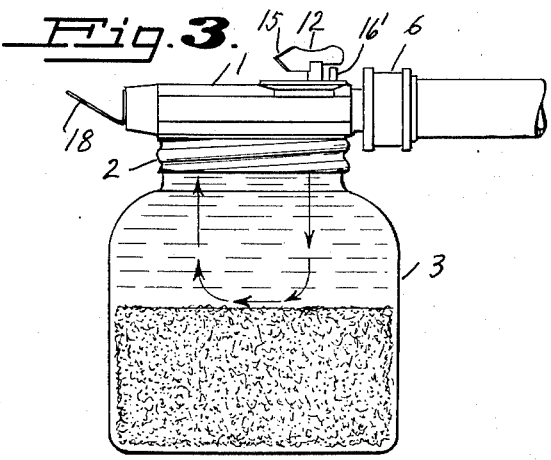

2,536,361

UNITED STATES PATENT OFFICE 2,536,361

PLANT FOOD FEEDER

Austin P. Flanders, Contra Costa County, Calif.

Application March 11, 1946, Serial No. 653,686

2 Claims. (Cl. 299—84)

The present invention relates to improvements in a plant food feeder, and its principal object is to provide means attachable to a garden hose or the like for automatically providing a fertilizing solution of approximate standard hydroponic strength from suitable hydroponic salts or complete plant food powder.

More particularly it is proposed to provide for this purpose a nozzle having a plant food container suspended therefrom, and constructed in such a manner that a portion of the water passing through the nozzle is diverted or by-passed to flow through the container, and to sweep over the surface of the fertilizer or nutrient for adding a desired amount of nutrient in solution to the stream passing through the nozzle.

It is further proposed in the present invention to provide means whereby the amount of water by-passed through the container may be regulated and controlled.

Another object of my invention is to arrange the control means in such a manner that the entire range of control may be effected by the turning of a control element through an arc somewhat less than a complete circle.

It is further contemplated in the present invention to provide means for discharging the water from the nozzle in the form of a spray arranged in such a manner as to reduce the back pressure to a minimum and to also allow the water to be discharged in the form of a thin stream for watering flower pots and the like when the pressure at the faucet is reduced.

Further objects and advantages of my invention will appear as the specification proceeds, and the novel features of my plant food feeder will be fully defined in the claims attached hereto.

The preferred form of the invention is illustrated in the accompanying drawing forming part of this application, in which:

Figure 1 shows a top plan view of my nozzle arrangement;

Figure 2, a vertical section through the same, as applied to a container; and

Figure 3, a side view of the nozzle arrangement, as attached to a container, on a reduced scale.

While I have shown only the preferred form of my invention, it should be understood that various changes or modifications may be made within the scope of the claims hereto attached, without departing from the spirit of the invention.

Referring to the drawing in detail, my nozzle 1 is mounted transversely upon a cap 2 adapted for threading on a suitable container 3, which latter is intended to hold the fertilizer or nutrient.

For the purposes of my invention, it makes little difference to what extent the container is filled with nutrient.

The nozzle 1 is formed with a cylindrical bore, which is relatively large at the rear end, as shown at 4, and is stepped down to a smaller diameter in the middle and front portions of the nozzle, as shown at 5. The rear end of the nozzle is formed with a suitable coupling 6 adapted for fastening to a garden hose in a conventional manner.

The nozzle is formed with two transverse or radial holes or ports 7 and 8, both of which communicate with the container. The port 7 extends from the larger bore 4, near the rear end of the nozzle, and the hole 8 extends from the smaller portion 5 of the bore near the front end of the nozzle.

While these holes or ports may be arranged in any suitable manner, I show portions of the same embodied in a pair of screws 9, which may be used at the same time for securing the nozzle upon the cap 2, the heads of the screws bearing against the underface of the cap and being slotted, as at 10, to give better access for the liquid.

The front screw may also be provided with a small cross-member 11 to serve as a screen to prevent entry of foreign matter.

The port area of the hole 7 is controlled by a valve 12 which is threaded into the nozzle housing in alinement with the hole 7, as at 13, and is formed with a suitable pointer 15 sliding over a dial 16, which may be calibrated to give the strength of the solution for different positions of the valve pointer.

A stop 16' limits the rotation of the pointer to an arc somewhat less than that of a full circle, the idea being that the entire range of desired solution may be obtained by this simple adjustment.

A suitable washer 17 is provided for sealing the cap upon the container.

At the front end of the nozzle I provide a deflecting plate 18, which preferably extends from the bottom of the nozzle and which is intended to diffuse the stream of water emanating from the nozzle in the form of a spray, without creating undue back pressure.

The hole 19 in the deflector, preferably oval or elongated in shape, allows the water to be discharged in the form of a thin stream for watering flower pots or the like, when the pressure at the faucet is reduced.

In operation, the nozzle 6 is secured upon a garden hose in the conventional manner, and the device is held with the container suspended from and underneath the nozzle.

The container is filled with fertilizer or nutrient to any desired height, as shown in Fig. 3. When the faucet feeding the garden hose is opened, and water is made to discharge through the nozzle, the main body portion of the water will pass directly through the bore, but a certain portion of the water will be diverted to pass into the container through the port 7, and out again through the port 8.

At first, if the bottle has not been filled with water before starting, it will fill at the beginning of the operation. After the container is filled with water, the by-pass water will continue to pass downward through the body of water, to gently sweep over the surface of the fertilizer within the container, and then rise again for discharge into the main stream through the port 8.

In this manner a small amount of fertilizer solution is continuously added to the main stream.

The amount of solution to be added may be controlled by proper setting of the valve 12.

It should be noted that in the use of my nozzle, I do not depend upon stirring or agitation of the fertilizer, but merely upon the gentle sweep of the water over the top surface of the same. There is no vertical inlet tube leading into the powder or fertilizer, and the area subjected to the gentle sweep of the water remains substantially the same, whether the container is full or nearly empty.

The deflector 18 is designed to produce a spray or a sprinkling stream for general gardening purposes and lawn sprinkling, but to change automatically to a small unbroken stream for watering pots or young plants when the flow at the garden faucet is reduced.

The deflecting of the stream is sufficiently far from the nozzle constricture to substantially eliminate back pressure, and this is considered an advantage, since any appreciable back pressure would alter the concentration or would interfere with the operation of my device.

The main principle of the invention consists in the diverting of a portion of the water so that it flows over the top surface only of a column of plant food powder, whereby the water is made to absorb the desired proportion of nutrient, and then is conducted back into the main stream. This is accomplished by directed flow and varied pressure only, and does not require any orifices small enough to be stopped up if particles of the nutrient or impurities pass through them.

I claim:

1. In a plant food feeder of the character described, a cap adapted to have a plant food container suspended therefrom and having a flat top and a pair of spaced holes in the top, a liquid carrying tube overlying the cap and having an axial passage and a pair of spaced holes alined with the holes in the cap and leading to the passage, and a pair of screws passing through the cap holes and threaded in the tube holes for securing the tube upon the cap, the screws having axial holes establishing communication between the food container and the passage.

2. In a plant food feeder of the character described, a cap adapted to have a plant food container suspended therefrom and having a flat top and a pair of spaced holes in the top, a liquid carrying tube overlying the cap and having an axial passage and a pair of spaced holes alined with the holes in the cap and leading to the passage, and a pair of screws passing through the cap holes and threaded in the tube holes for securing the tube upon the cap, the screws having axial holes establishing communication between the food container and the passage, and the tube having a valve member threaded thereinto opposite one of the tube holes and operable for controlling the port area of said hole.

AUSTIN P. FLANDERS.

REFERENCES CITED

The following references are of record in the file of this patent:

UNITED STATES PATENTS

| Number | Name | Date |
| --- | --- | --- |
| 140,465 | Burns | July 1, 1873 |
| 580,251 | Child | Apr. 6, 1897 |
| 612,433 | Orford | Oct. 18, 1898 |
| 654,132 | Bush | July 24, 1900 |
| 811,749 | Somers | Feb. 6, 1906 |
| 842,088 | Elfreth | Jan. 22, 1907 |
| 1,022,643 | Schellenger | Apr. 9, 1912 |
| 1,142,292 | White, Jr. | June 8, 1915 |
| 1,152,652 | McBoyle | Sept. 7, 1915 |
| 1,179,905 | Engelmann | Apr. 18, 1916 |
| 1,434,757 | Thomas | Nov. 7, 1922 |
| 1,502,822 | Hill | July 29, 1924 |
| 1,611,406 | Bell | Dec. 21, 1926 |
| 1,644,072 | Miller | Oct. 4, 1927 |
| 1,836,505 | Pritchard | Dec. 15, 1931 |
| 2,044,821 | Urban | June 23, 1936 |
| 2,058,901 | McPherson | Oct. 27, 1936 |
| 2,083,851 | Marcy | June 15, 1937 |
| 2,235,278 | Brunner | Mar. 18, 1941 |